(12) United States Patent
Caillouet

(10) Patent No.: US 6,230,477 B1
(45) Date of Patent: *May 15, 2001

(54) APPARATUS AND METHOD FOR HARVESTING CANE

(76) Inventor: Kenneth G. Caillouet, 523 Largarde St., Thibodaux, LA (US) 70301

( * ) Notice: Subject to any disclaimer, the term of this patent is extended or adjusted under 35 U.S.C. 154(b) by 0 days.

This patent is subject to a terminal disclaimer.

(21) Appl. No.: 09/055,610

(22) Filed: Apr. 6, 1998

Related U.S. Application Data

(62) Division of application No. 08/728,835, filed on Oct. 10, 1996, now Pat. No. 5,816,036.

(51) Int. Cl.[7] .................................................. A01D 45/10
(52) U.S. Cl. .................................... 56/14.5; 56/56; 56/63; 56/71; 460/44; 460/98; 460/100
(58) Field of Search ..................... 56/14.5, 14.6, 56/63, 71, 56; 460/42, 43, 44, 98, 100

(56) References Cited

U.S. PATENT DOCUMENTS

| | | | |
|---|---|---|---|
| 3,673,774 | * | 7/1972 | Mizzi ................................. 56/14.5 X |
| 3,942,307 | * | 3/1976 | Quick ................................. 56/14.6 X |
| 4,386,492 | * | 6/1983 | Tilby ................................. 56/14.5 X |
| 4,584,824 | * | 4/1986 | Hitamuta ............................ 56/14.5 X |
| 5,488,820 | * | 2/1996 | Cannavan .............................. 56/14.5 |

* cited by examiner

Primary Examiner—H. Shackelford
(74) Attorney, Agent, or Firm—Browning Bushman

(57) ABSTRACT

A two-row cane harvester 10 simultaneously harvests two rows of sugar cane in a green tropical cane field. Gatherer chains 62, 64 lift fallen cane stalks upwardly and support the fallen cane stalks as the harvester 10 moves through the cane field. A pair of topper mechanisms 54 top the cane stalks while base cutters 80 base cut the cane. A pair of transversely spaced turnaround devices 62 each move the cane transversely past the respective topper mechanism and toward a centerline 22 of the harvester, and thrust the topped cane stalks in a direction away from the harvester movement such that the topped cane stalks do not interfere with the cane moving toward the topper mechanisms by the gatherer chains. Base cut cane is received base first into the harvester intake. The cane is cleaned in a whole stalk condition with a cleaning mechanism 92 that includes a plurality of rotating tines 100 moving in a direction to engage and force the cane leaves toward a base of the cane stalk, thereby efficiently stripping the cane leaves. An extractor blower 106 removes the leaves from the rotating tines and the cleaned cane. A stalk cutter mechanism 120, 122 may be adjusted to cut the cleaned cane stalks into selected billet lengths. The cleaned cane billets may be conveyed to a transport for transporting to a sugar processing mill.

25 Claims, 7 Drawing Sheets

APPARATUS AND METHOD FOR HARVESTING CANE

This application is a Division of Ser. No. 08/728,835 filed Oct. 10, 1996 now U.S. Pat. No. 5,816,036.

FIELD OF THE INVENTION

The present invention relates to cane harvesters and, more particularly, to a chopper-type harvester for harvesting tropical green sugar cane, and to an improved method for harvesting tropical sugar cane which includes semi-erect and lodged cane stalks.

BACKGROUND OF THE INVENTION

Sugar cane is conventionally harvested by manually first burning the cane to remove the leaves, then hand cutting and piling the cane, and finally mechanical grab loading the piled cane into a transport vehicle. When a cane field that has not been burned (green cane) is cut by hand, the output of cut and piled cane is only approximately one-third of that which is achievable by hand cutting burned cane. Therefore, the cost of hand cutting green cane is uneconomical for most applications. As the economies of sugar cane producing areas improves, hand labor for cutting cane becomes difficult to justify. Accordingly, mechanical cane harvesters are being increasingly used to supplement and replace the vanishing hand cutters.

Their are two basic types of machines for mechanically harvesting cane: (1) a soldier-type harvester, and (2) a chopper harvester. A soldier harvester is used for harvesting erect cane, and takes the erect cane into a center carrier where the cane is conveyed through the body of the harvester while remaining vertical. While the cane is erect in the field, the tops of the cane are removed and the cane is base cut at ground level. If the cane is not standing erect, the soldier-type harvester is designed so that its front end lifts the cane to an erect position prior to the cane entering the center carrier for progressing through the harvester in the erect position. The cane is thus lifted into the center carrier and, while held by the center carrier, is topped, base cut, and passed through the carrier in the body of the harvester. After being carried in its vertical position through at least a portion of the body of the harvester, the cane is piled in one or multiple row heaps, where the cane is later conventionally burned to remove the dead leaves on the millable cane stalks. The cut cane is loaded whole stalk into transports by grab loaders. Solider-type cane harvesters are disclosed in U.S. Pat. Nos. 5,379,577, 5,303,533, 4,483,130, 4,380,281, 4,232,775, 4,165,596 and 3,090,183.

While the soldier harvester works quite efficiently in conditions where cane varieties allow the cane to be easily moved to an erect position without burning, the soldier harvester does not work as well in cane fields where the row spacing is less than 5 ft. 6 inches wide, or where burning of the cane on the ground is not allowed. Since the cane is transversely piled whole stalk, a large row spacing is desired to stack the relatively long whole cane stalks. As a practical matter, Louisiana has the only significant location which has the type of cane varieties and field conditions which allow for the effective use of a soldier-type harvester.

Conventional tropical cane harvesters or chopper harvesters are characterized by their bottom first feeding of the cane stalks into the mouth of the harvester. This is followed by a chopper cleaning mechanism which cuts the passing cane and leaves into short pieces. A forced air current is used to remove the free leaves. The chopped cane is conventionally passed through a side loading conveyor and loaded directly into the transport. While a conventional bottom first chopper harvester works reasonably well in a burned cane field where most of the cane is erect, it has more difficulty working in a green, unburned cane field, and also has difficulty working a field with much of the cane in a semi-erect or lodged condition.

Those familiar with cane harvesting operations recognize that as the yield per area of harvested cane increases, more of the cane is fallen and is either semi-erect or lodged, and less of the cane remains erect. While chopper harvesters theoretically are designed to work in green cane fields where cane varieties result in a high yield with more cane stalks being semi-erect or lodged, conventional chopper harvesters are almost never used to harvest green cane, and instead harvest cane predominantly from burned cane fields. Burning standing cane in the field removes most of the leaves, thereby facilitating harvesting of the cane without the harvester becoming plugged with material as it moves through the field. Cane burning is environmentally undesirable, however, since clouds of ash from a burnt field may drift over residential areas, thereby making breathing difficult and creating a significant nuisance by covering patio furniture, automobiles and outdoor plants with a layer of ash.

Those familiar with processing cane have long recognized that burning the cane has a significant and undesirable effect upon the amount and quality of the sugar produced from the cane. From a cane processing standpoint, cane should desirably be brought to the processing plant whole stock and green, with little dirt and cane leaf or top matter. Conventional chopper harvesters which operate in burned cane fields cut the stalks of cane into billets which are typically from eight to ten inches long, thus increasing the likelihood that at least some of the sugar in the cane stalk adjacent the end cuts will become lost or will decompose before processing.

Even then harvesting burned cane, conventional bottom first chopper harvesters have the following problems when the cane is semi-erect or lodged: (1) the inability to remove tops from the cane; (2) the inability to base cut cane efficiently and cleanly; (3) substantial damage to the field and to the planted cane as a result of harvester operations, resulting in future crop yield losses and requiring manual replanting of a higher percentage of total cane area; and (4) substantial harvesting costs due to low production rates and high initial costs of conventional single-row, bottom first copper harvesters.

Due to the above problems, the overall cost of mechanical harvesting burned cane can be higher than a reasonable hand cutting operation. When a chopper harvester attempts to harvest green cane, each of the problems mentioned above for the chopper harvester becomes more pronounced.

A primary problem for bottom first chopper harvesters working in green cane field is the abundance of leaves on the cane. This effects the harvester in two distinct places, namely the front end of the harvester and the body of the harvester. The front end of the harvester must allow the harvester to move through fallen down and windblown green cane in a continuous fashion without choking the cane prior to feeding the cane into the harvester. While conventional bottom first chopper harvesters may move reasonably well through some burned cane fields, bottom first chopper harvesters typically encounter extreme difficulty in green fields because of the abundance of cane leaves at the front end of the harvester. Moreover, once cane is in the body of a harvester, the harvester must clean the cane without choking by first removing the leaves from the cane stalks and then removing the leaves from the body of the harvester.

Conventional chopper harvesters do not have adequate mechanical devices to separate the leaves from the cane stalks while the green cane passes through the harvester. More particularly, conventional chopper harvesters have a topping mechanism that is far out in front of the cane intake into the body of the harvester and is operationally independent of the crop divider scrolls. Conventional crop dividers cannot therefore lift and feed much of the semi-erect or lodged cane into the topping mechanism. If tops are not efficiently removed at the front end before they enter the mouth or intake of a harvester, the body of the harvester must then accommodate this extraneous material, which becomes particularly difficult in wet conditions. Some method of effectively and more efficiently topping green cane is desirable to facilitate removal of more of the cane tops prior to the cane entering the body of the harvester.

The distance separating adjacent rows of cane caused by the crop dividers scrolls on each side of conventional single-row chopper harvesters is typically not sufficient to fully separate the harvested row from the adjacent row. Accordingly, the leaves from an adjacent cane row with lodged cane become intertwined with leaves from the harvested row. Also, conventional dividers scrolls are substantially vertical with respect to the ground when working in the field. Conventional divider scrolls thus do not efficiently lift or transversely separate adjacent rows of cane, thereby impeding free movement of the harvester through a green cane field.

As the front of a conventional bottom first chopper harvester moves through fallen green cane, it pushes the tops of the cane in the same direction that the harvester is travelling. The harvester attempts to separate a leaf from its stalk of cane prior to the cane entering by pulling in an upward direction relative to the stalk, which is a much more difficult leaf removal operation than pulling perpendicular to the stalk or downward relative to the stalk. The action of conventional bottom first chopper harvesters in pulling leaves upward relative to the stalk practically restricts forward movement of the harvester through the cane field by pulling cane roots from the ground. This action also intertwines the leaves of adjacent cane rows by lifting the leaves in a direction toward the top of the cane stalks. It then becomes necessary to cut through an accumulation of intertwined leaves and cane to separate adjacent rows, thereby limiting forward movement of the harvester. Cutting apart adjacent rows of cane is conventionally done with a vertical crop divider knife located near an upper portion of each crop divider scroll. This action of a crop divider knife results in a substantial amount of good millable cane being left in the field.

Conventional bottom first chopper harvesters remove leaves from the cane within the harvester by chopping simultaneously through both the cane and leaves. Conventional chopper harvesters blow away free cut leaves, but cannot blow away that part of the leaf which is still attached to the stalk or is trapped by the passing cane. Therefore, the cleaning efficiency of a conventional chopper harvester becomes a function of how short the cane billets are cut. As cane billets are shortened in length, the cane is cleaner. However, shorter billets result in more juice loss and juice deterioration adjacent the many cut ends. Also, more pieces of good millable cane get sucked out of the harvester with the leaves.

The disadvantages of the prior art are overcome by the present invention. An improved chopper-type harvester is hereafter disclosed suitable for harvesting tropical cane. Most importantly, the harvester of the present invention is able to move efficiently through unburned or green tropical cane fields with semi-erect or lodged cane, and outputs cane which may be more efficiently used by the cane processing facility.

SUMMARY OF THE INVENTION

The chopper-type harvester of the present invention is particularly well suited for harvesting cane which includes semi-erect and lodged cane stalks common to high yield varieties of tropical sugar cane. The harvester is capable of harvesting a burned cane field, but is particularly designed for harvesting green cane. The harvester is highly efficient at removing most of the valuable cane from the field, and is capable of delivering clean, green cane stalks in whole stalks, semi-whole stalk or long billet form to the mill. Residual dirt or leaves from the cane is discharged from the harvester, and is cut and deposited in a manner which promotes new cane growth after harvesting. When harvesting tropical cane, high production per area is realized, environmental problems associated with burning cane may be eliminated, and the mill may be supplied with cane stalks containing a high juice content with little or no decomposition of the sugar in the juice.

The chopper-type harvester is a bottom first harvester which, in a preferred embodiment, simultaneously harvests two rows of cane. The front end of the harvester includes chain gatherers to position the semi-erect and lodged cane stalks so that they are parallel (generally vertical) with the other cane stalks prior to topping. Accordingly, the cane is efficiently topped to prevent much of the leafy material from entering the harvester. After topping, the cane stalks are aggressively moved transversely and are thrown downward by a turnaround device so that the top of the cane stalk is moved away from the front of the harvester. The chain gatherer speed is controlled so that the vertical cane stalk remains substantially vertical prior to topping (ground speed of the chain approximates the harvester speed).

Cane movement relative to the harvester is abruptly altered by the turnaround device so that subsequent to base cutting the cane is moved away from the harvester aground speed for the return side of the chain to the front of the harvester and away from the topper is approximately twice the harvester speed). The turnaround device turns the upper part of the cane forward at twice the machine speed while at essentially the same time the bottom of the cane is being pulled into the mouth of the harvester by the base cutter blade kicker and the knock down drum in a manner which transversely thins the incoming cane. Brush pipes guide the cane stalks when moving away from the turnaround device, and the chain is shielded to prevent clogging with leaves. The base cut cane is bottom fed into the harvester, with the base cutters acting to transversely distribute the cane stalks from the two rows of cane substantially uniformly across the mouth of the harvester.

The cane stalks are cleaned within the harvester by rotating strippers which pull the leaves toward the base of the cane stalk. Removed leaves are blown upward away from the cane stalks by powered extractor fans, then may be conveyed to the sides of the harvester for dumping onto the ground. Cleaned cane stalks may be then cut into selected lengths, which in a preferred embodiment may be long billets from approximately sixteen to twenty inches in length. Cane billets may be conveyed directly into a transport. Alternatively, the cleaned cane may be cut to semi-whole stalk lengths, then either conveyed into a trailer or dumped back onto the field for subsequent pickup and transport to the mill. In a further embodiment, the cane may be loaded whole stalk onto a trailer or other transport. The efficiency of the harvesting operation allows a two row, four-hundred horsepower harvester to harvest approximately one-hundred tons of cane per hour, while a prior art single row, three-hundred twenty-five horsepower harvester typically harvested approximately thirty tons of cane per hour.

An object of this invention is to provide an improved harvester for harvesting either burned or green cane. More specifically, the harvester includes a front end which allows for relatively free movement of the harvester through the field without damaging cane stalks or pulling the roots of the cane out of the ground. The two-row harvester does not require cutting through each adjacent row of the cane prior to harvesting, and allows free movement of the harvester through the field without choking the intake of cane into the harvester.

Another object of the invention is to provide a harvester that efficiently removes the tops from millable stalk lengths of cane before the stalks enter the body of the harvester. Cane tops and green leaves are preferably shredded to be more manageable for being conveyed back onto the ground, and for better internment into the soil and more rapid decomposition. Most importantly, topping of the cane stalks is efficiently accomplished while allowing the operator a clear vision of the freshly topped cane stalks so that the operator can desirably set the correct topping height.

Another object of the invention is to efficiently base cut the cane to promote removal of substantially all of the valuable cane from the field, and to reduce the extended and split cane stubble which promotes disease in the growing cane field. By lifting the semi-erect and lodged canes prior to base cutting, cane may be efficiently cut without the base cutter operating in the soil.

A further object of the invention is to provide a harvester which efficiently removes leaves from millable cane stalks within the harvester while the cane is in a whole stalk condition. The cleaned cane may be cut into desirable lengths which are longer than conventional chopper harvesters since cane cutting into short length billets is not required to remove leafy material from the cane stalks. Accordingly, little cane juice is lost, and little cane sugar is exposed to the air for decomposition.

Still another object of the invention is to provide a harvester which is able to generate a sufficiently high production rate that the harvester becomes economically justifiable. By providing two-row harvesting, the harvester may move through the field at a slower speed, thereby allowing the front end more time to remove much of the leafy material and prevent its entry into the harvester, thus resulting in cleaner cane. By providing a two-row harvester, the harvester and transport traffic in the field is reduced, thereby reducing damage to the new cane. Shredded top and leaves are deposited onto the field between rows of planted cane, so that this extraneous material does not cover or otherwise smother the planted cane rows and this does not prevent sunlight from promoting new cane growth. By shredding the extraneous leafy material more completely, its volume is reduced. By rolling over the deposited material with the harvester tires, the leafy material is pressed into the ground to further reduce its volume and promote decomposition. The tire rolling on the leafy material also promotes traction in wet field conditions. By depositing this extraneous material between alternate rows of cane, more efficient alternate row cane irrigation techniques may be used.

According to an exemplary embodiment of the invention, a method is provided for harvesting green cane using the following steps: 1) continuously lifting and transversely separating adjacent rows of cane while moving a harvester through the field; 2) feeding the cane into a topping mechanism for topping the cane; 3) transversely moving the upper millable cane stalks from two cane rows toward each other and toward the center of the harvester, and then moving the upper part of the cane stalks forward and away from the harvester while base cutting the cane; 4) transversely dispersing the cane stalks and feeding the cane stalks bottom first into the harvester; 5) stripping leaves from the cane stalks within the harvester by pulling leaves in a direction toward the base of the cane stalk; 6) blowing the stripped leaves away from the cleaned cane; and 7) cutting the cleaned cane stalks into selected lengths.

A feature of the invention is that the transverse distance separating the chain gatherer centerlines for the two rows of harvested cane is equal to the row spacing, which typically is not longer than approximately the average length of a cane leaf. Accordingly, a leaf from one row of cane intertwined with the stalk from the adjacent harvested row of cane are separated prior to topping by the action of the center scroll and the chain gatherers. The center chains returning to the front of the harvester are diverging to prevent leaf buildup, and at least a substantial length of the return portion of the center chains is covered.

The approach angle of the crop dividers is preferably less than about 55° with respect to the ground, and preferably is from about 45° to about 55° with respect to the ground, to efficiently lift and transversely separate adjacent rows of cane from the two harvested rows. The adjacent row of cane is also mechanically separated from the nearest harvested row of cane by a distance greater than the length of the average cane leaf. By transversely separating the adjacent row of cane from the two harvested rows, the harvester may freely move forward through the cane field without the necessity of cutting through the adjacent cane rows with a crop divider knife.

Still another feature of the invention is to separate leaves from the cane stalks within the harvester by applying forces on the leaves which act in a direction toward the bottom of the cane stalks as the cane pulled through the harvester. It is a further feature of the invention that the leaves are removed from the cane stalks while the stalks are full length, thereby minimizing damage to the cane stalks.

A significant advantage of the invention is that semi-erect and lodged cane stalks are lifted prior to topping, and the stalks are substantially aligned such that topping may be more efficiently accomplished. The harvester is constructed such that the operator can easily see the topped cane and control the topping height.

Another significant advantage of the invention is that extraneous leafy material is removed from the cane stalks and is deposited in the field in a manner which promotes growth of new cane.

Yet another advantage of the invention is that a knock down drum is provided for knocking down and transversely thinning the base cut cane for feeding the thinned cane base first into the harvester. A backfeed roller in the front end of the harvester prevents long cane stalks from engaging the ground, thereby minimizing entry of dirt with the cane stalks into the harvester.

Yet another advantage of the invention is that hydraulically powered cylinders may be used to adjust the height of one side of the harvester relative to the other side of the harvester, thereby allowing the operator to horizontally balance the harvester as it travels through the field.

These and further objects, features, and advantages of the present invention will become apparent from the following detailed description, when reference is made to the figures in the accompanying drawings.

DETAILED DESCRIPTION OF PREFERRED EMBODIMENTS

Figure 1:
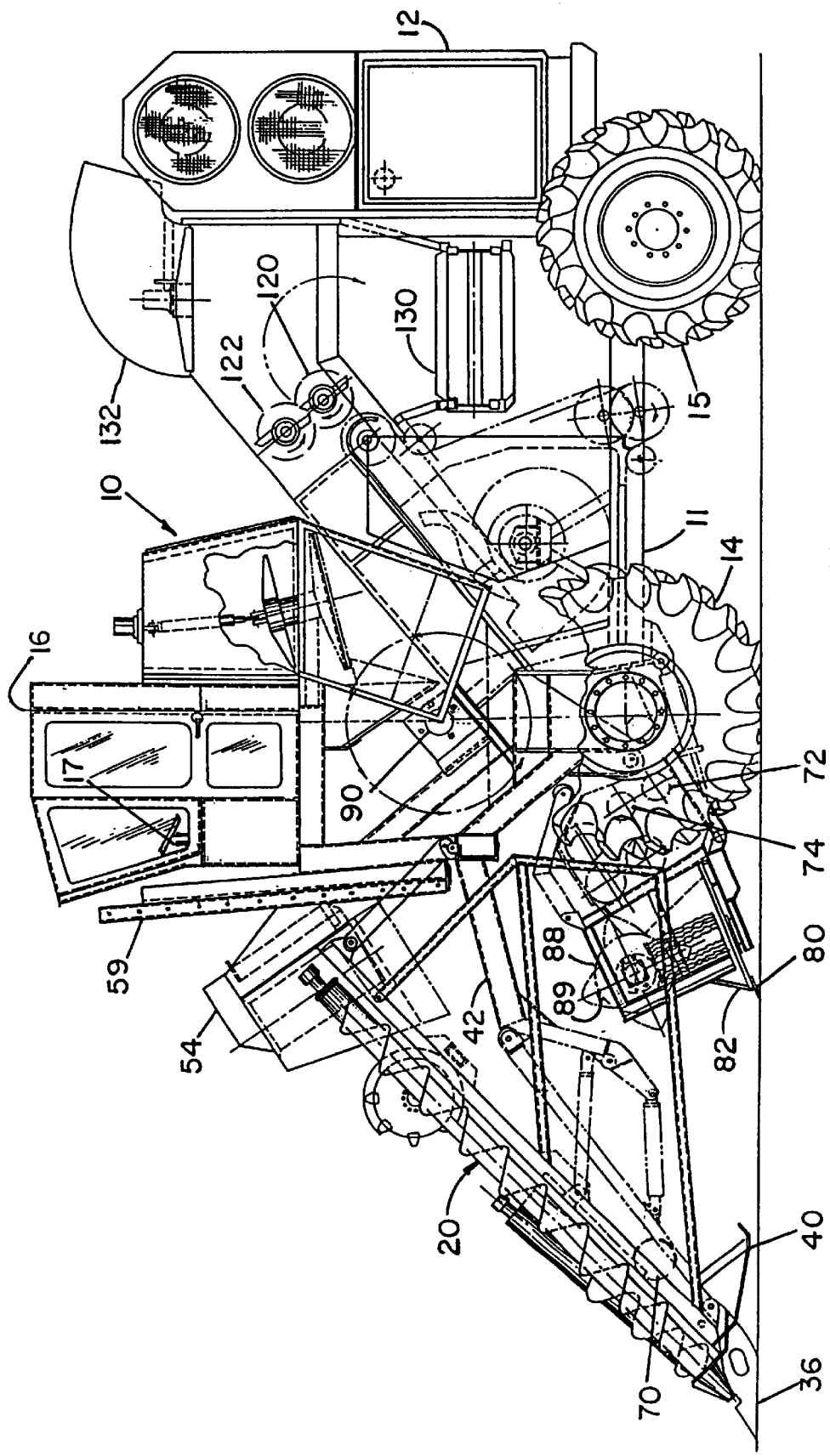
FIG. 1 is a side view of one embodiment of the cane harvester according to the present invention.

FIG. 1 illustrates one embodiment of the two-row sugar cane harvester 10. According to the present invention, the harvester is designed for harvesting green, tropical cane including semi-erect and lodged cane stalks. The harvester 10 positions the cane in a substantially erect position for more efficiently topping and cane base cutting. With respect to a transverse position across the two rows of harvested cane, incoming cane is thinned and uniformly distributed across the mouth of the harvester, and is moved linearly (parallel to the length of the rows) through the harvester at a speed faster than the forward speed of the harvester for efficient cleaning of the cane.

The harvester 10 includes a conventional diesel powered engine 12 which powers a drive train to power rotation of both large front wheels 14 and/or small rear wheels 15. The conventional frame or chassis 11 supports the engine and provides a base for an operator cab 16 which contains a plurality of conventional operator controls 17, including controls for regulating the speed of the harvester and the speed of the various harvester conveyor mechanisms described subsequently. In the description which follows, like parts are referred to throughout the specification and are marked in the drawings with the same reference numbers. Certain features of the harvester are illustrated in somewhat schematic form in the interest of clarity and conciseness.

Figure 2:
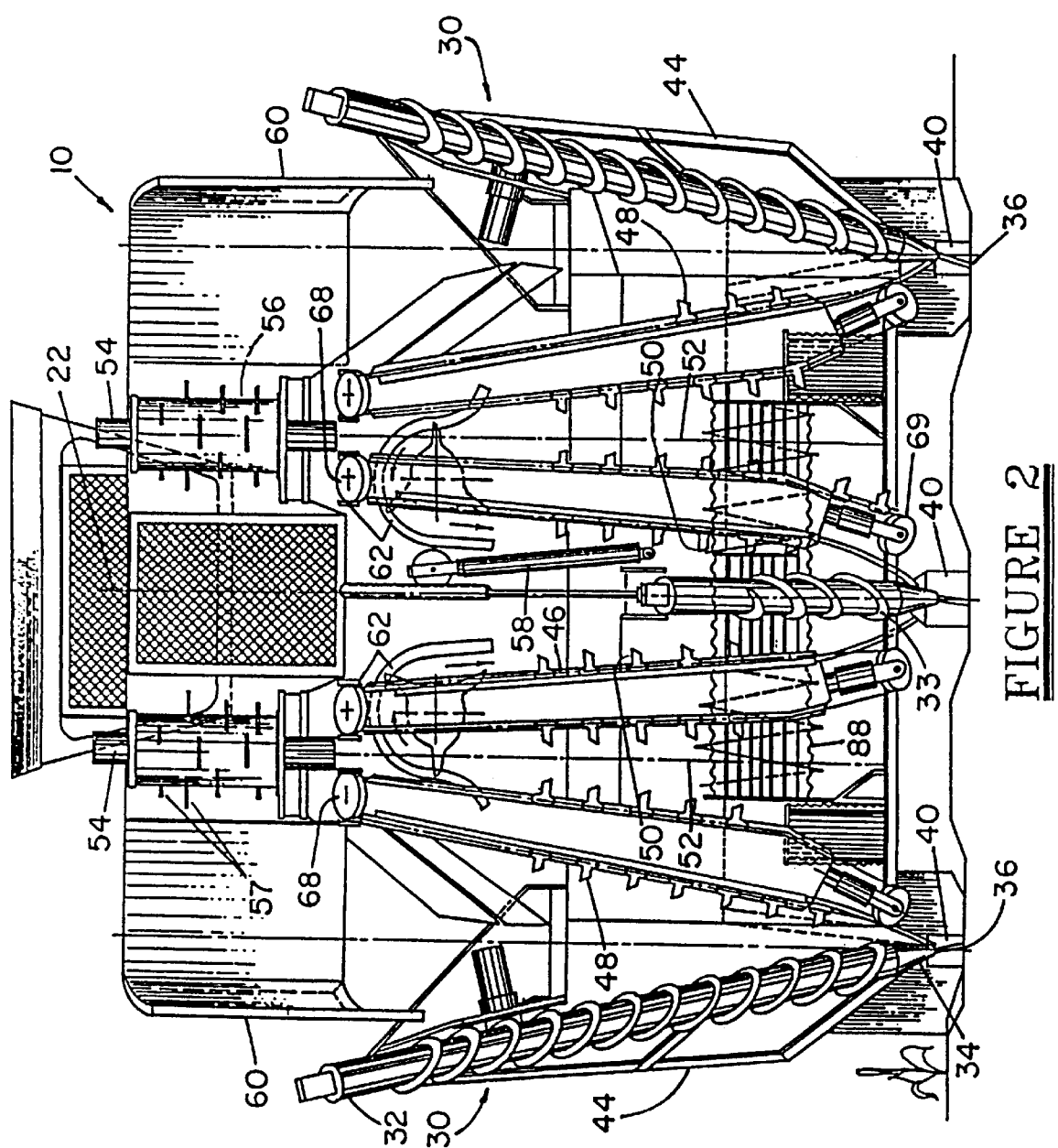
FIG. 2 is a front view of as shown in FIG. 1.

Referring now to FIGS. 1 and 2, the cane stalks are manipulated by the front end 20 of the harvester 10 so that all cane stalks are substantially parallel for the cane topping operation. In many cases, the green cane field contains erect or substantially vertical cane stalks, as well as semi-erect, lodged or otherwise fallen cane stalks. The front end 20 is designed to lift and position the semi-erect and lodged cane stalks so that all cane stalks are vertical when topped. It is important to understand, however, that the cane stalks need not be vertical when topped, provided that the stalks are parallel. Accordingly, if much of the cane in the field is inclined at an angle of 70° away from the travel of the harvester, the front end 20 of the harvester may be controlled so that the semi-erect and lodged cane stalks are also positioned at the same approximately 70° angle in a direction away from the travel of the harvester during the topping operation.

When making an initial cut of two harvested rows into a cane field, the two harvested rows are separated from an adjacent row on each side of the harvested rows by each of the two crop divider scroll assemblies 30. After the initial two-row cut, one side (typically the left side) divider scroll assembly may be deactivated, while the right side crop divider scroll assembly remains powered for separating the two harvested rows from the adjacent row to the right side of the harvested rows during each subsequent pass of the harvester through the cane field.

Each crop divider scroll assembly 30 comprises scroll 32 preferably angled from about 45° to about 55° relative to the ground (see FIG. 1). A front scroll cone 34 is positioned immediately above the ground and in the furrow between the right harvested row and the row to the right of the harvester. A scroll knife 36 and a scroll shoe 40 (see FIG. 2) assist on separating the right side harvested row from the adjacent cane row which remains in the field during that pass of the harvester. Scroll support and lift mechanism 42 (see FIG. 2) may be activated for independently altering the angle of each scroll assembly 30 relative to frame 11 and thus the ground. The scroll side shields 44 serve to keep the divided cane stalks away from the harvester as it passes through the field. The short center scroll 33 along with a corresponding scroll knife and scroll shoe are provided for at least partially separating the two harvested rows of cane and help to feed the cane into each of the two spaced apart gatherer chains. Tests on a prototype harvester have indicated that the structural supports for the center scroll 33 desirably are beefed up, since the center scroll is subject to higher forces than originally anticipated.

In order to position all the cane stalks at substantially same angle for an efficient topping operation, each row of cane is engaged by center gather chain 46 and a side gathered chain 48 which rotate in opposite directions. The chain grabbers 50 engage and lift the semi-erect and lodged cane stalks as the harvester moves into the cane stalks which are positioned generally in a direction along a respective one of the two gatherer chain centerlines 52. Each row of cane is thus lifted and separated so that substantially all the cane stalks are substantially parallel when the cane is topped by one of the two topping mechanisms 54. As shown in FIGS. 1 and 2, each topper mechanism 54 includes a forwardly inclined shredding drum 56 with a plurality of axially and circumferentially spaced cutters 57 thereon for shredding the leaves and tops of the cane stalks while simultaneously topping the cane. The topping height may be controlled by regulating hydraulic fluid to the topper lift mechanism 58 which raises and lowers the topper mechanisms on guide rails 59. The counter rotation of the drums 56 flings the cane tops and leaves from each row transversely outwardly from harvester centerline 22 for engaging a respective one of the topper shields 60, so that the shredded cane may then drop in the furrow between rows for subsequently being run over by the tires 14, 15.

After the initial cut into the cane field, the right side scroll assembly 30 cuts to separate the right side harvested row from the standing row to the right of the harvester. As shown in FIG. 1, the angle of the scroll 32 is adjustable, and generally will be from 45° to 55° relative to the ground when the harvester is moving through the field. The gatherer chain 46, 48 lift and center the cane stalks from each harvested row to be substantially aligned with a respective gatherer chain axis 52, which is substantially parallel with the longitudinal center of the respective harvested row. As shown in FIG. 2, the center scroll 33 is in the center of the furrow between the two harvested rows, and the right side scroll cone 34 is in the center of the furrow between the right side harvested row and the cane row to the right of the harvester. The scroll 32 is angled both upward and to the right, thereby increasing the transverse separation between gatherer drive centerline 52 and the cane stalks in the unharvested row which are moved to the right side of scroll 32 (which is to the left of scroll 32 as shown in FIG. 2) as the harvester passes through the field. By the time the cane reaches the top of the right hand scroll 32, this transverse spacing is greater than the length of the average cane leaf so that the cane leaves in the harvested row are not intertwined with the stalk of an adjacent cane row, but instead are separated by the center crop divider scroll and the action of the chain gatherers. The harvester may thus move through the field freely without the necessity of cutting cane stalks in the row to the right of the harvester with a crop divider knife. As previously cited, both the right side and the left side scroll assemblies serve this function during the initial cut into the cane field.

To assure that the green cane is efficiently topped, a turnaround device 62 is provided that the upper end of each of the center gatherer chains 46 to force the upper ends of the cane stalks through the topping mechanism 54. Each turnaround mechanism 62 (see FIGS. 2, 3 and 4) is mounted to and carried by the harvester, and moves the upper portion of the millable cane stalks from each of the two gatherer centerlines 52 generally toward the center of the harvester and then forward of the harvester, thereby allowing the operator in cab 16 to view the freshly topped cane and properly determine whether the topping height should be raised or lowered. Each of the two turnaround devices 62 thus aggressively directs the top of the cane away from the harvester and in the direction of the harvester movement after the cane is topped. Without the turnaround mechanisms 62 to drive the cane through the topping mechanisms 54, portions of the millable cane stalk may be caught in and dragged through the topping mechanism. The turnaround mechanisms 62 quickly redirect the cane after being topped so that there is very little linear distance (parallel with the rows of cane being harvested) through which the cane moves as it is topped.

The turnaround device 62 includes a toothed rotor 64 and at least one side rail 66 which together quickly divert the cane travel approximately 180° from a direction in coming to the shredding drum 56 to a direction away from the shredding drum, and simultaneously move the cane transversely inward from the gatherer chain centerline 52 toward the harvester centerline 22. The cane is turned around 180° and also moved transversely by the U-shaped portion 65 of the rail 66. While forcing the upper portion of the millable cane stalk through the topping mechanism 54, the turnaround mechanism 62 also moves the upper portion of the millable cane stalks toward the center of the harvester and then away from the front of the harvester in the direction of the harvester travel. Chain sprocket 68 thus turns the top of center chain 46 through the 180° turn, and cooperates with the discharge end 67 of side rail 66 to thrust the topped cane in the direction of the harvester travel. This action insures that the upper portion of the millable cane stalk has a free and unrestricted path which moves the topped cane out of the way of the incoming cane between the gatherer chains 46, 48 which has not yet been topped. By moving the upper portion of the millable stalk toward the harvester center and forward, the two rows of cane are transversely thinned prior to being fed into the mouth of the harvester. Rather than simply knock the cane down and base cut the cane in the manner of a conventional chopper harvester, the cane entering the harvester of the present invention is first picked up by the gatherer chains and brought to a supported position for the topping operation, and is then pushed downward, base cut, and thinned for entering the mouth of the harvester. The turnaround devices 62 force the upper portion of the millable cane stalks transversely passed the topper mechanisms and then transversely toward the centerline 22 of the harvester 10, then throw the upper portion of the cane stalks forward while the bottom portion of the millable cane stalks are being base cut and pulled inward and toward the centerline 22 of the harvester by the base cutters 80 and knock down drum 88. Accordingly, the cane is allowed to be fed into the mouth of the harvester in a transversely thinned condition for better stripping of the leaves off the cane without the topped and cut cane interfering with the incoming cane which has not yet been topped or base cut. The turnaround mechanism 62 is thus important to the success of the harvester 10 since it eliminates the cane which is being topped from being knocked down onto the cane which is fed into the topper mechanisms.

Figure 3:
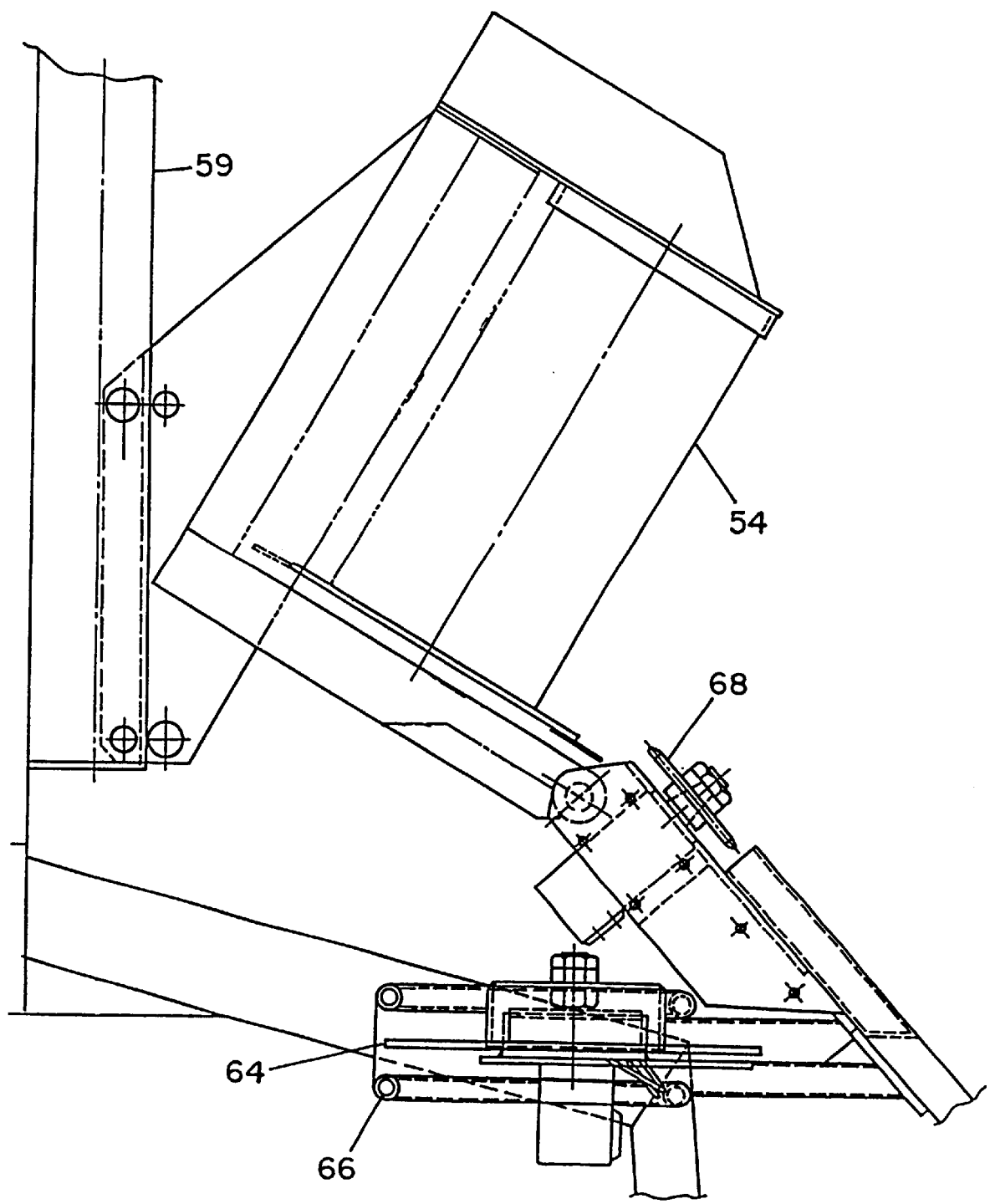
FIG. 3 is a side view of the topping mechanism and turnaround mechanism generally shown in FIGS. 1 and 2.
Figure 4:
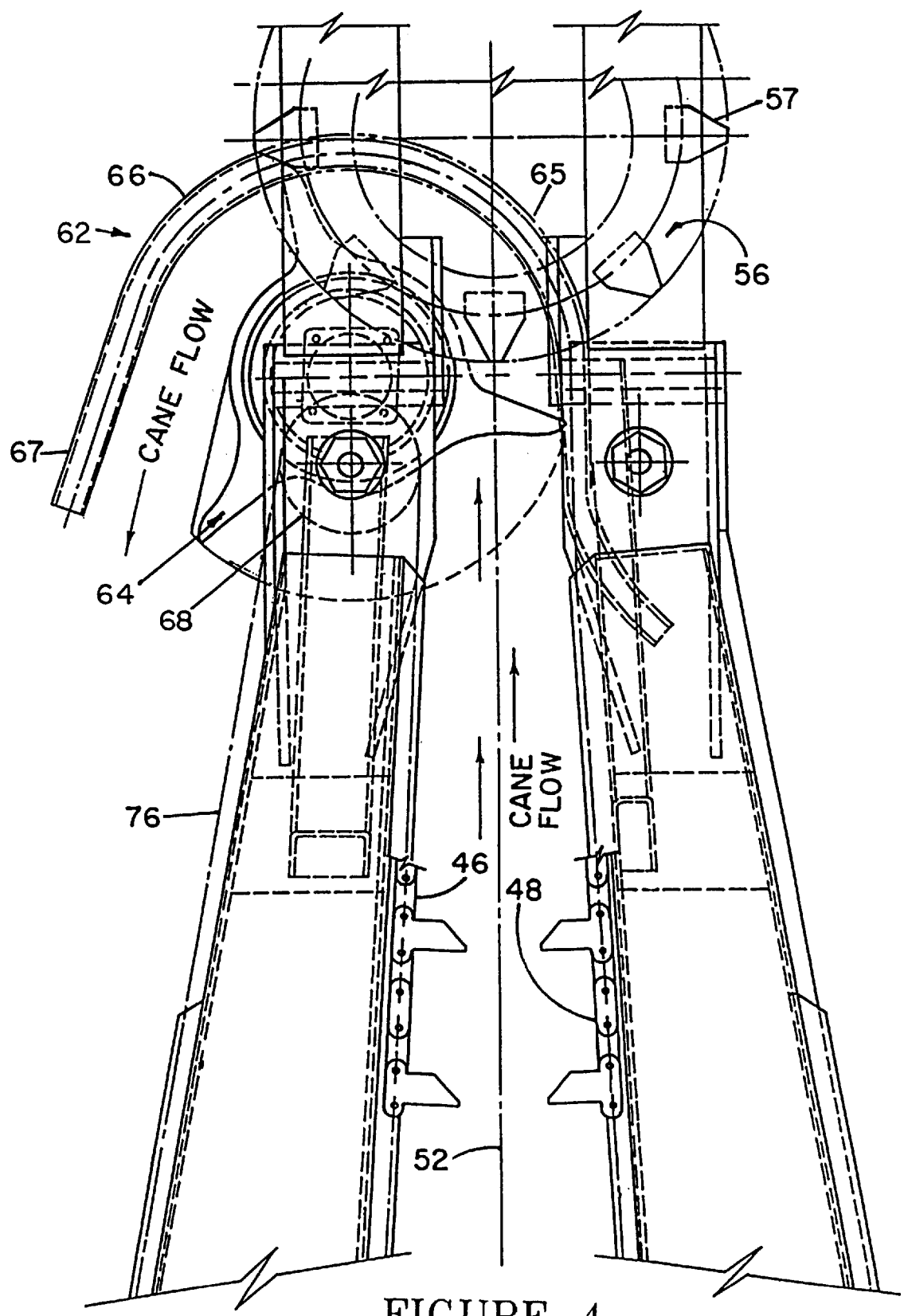
FIG. 4 is a detailed top view of the turnaround mechanism generally shown in FIGS. 2 and 3.

The turnaround device 62 thus supports the cane in a position below the topper and allows the cane to move substantially transversely through the topper, as shown in FIGS. 3 and 4, then be drawn bottom first into the harvester. The turnaround device 62 moves the cane at the same line speed as the gatherer chains which feed the cane into the topper 54. The cane is thus accepted by the turnaround device from the chains 46, 48 without breaking the cane due to different line speeds. The gatherer chains 46, 48 ideally move at approximately the same ground speed (but in opposite directions) as the harvester movement. Accordingly, the upper portion of the cane stalks along gatherer chain centerline 52 remain stationery since the chain speed equals and opposes the forward speed of the harvester. The effect of the turnaround mechanism 62 allows the top portion of the cane to be thrown forward and away from the harvester at twice the ground speed of the chains 46, 48. The effect is to throw the upper portion of the cane downward and toward the front end of the harvester at twice the velocity of the harvester moving through the field, thereby ensuring proper feeding of the cane to the harvester.

In order to reduce leaf buildup in the front of the gatherer chains, the chain sprockets or guides are arranged such that at least a substantial length of the center gatherer chain extending from the top sprocket 68 to the lower sprocket 69 travels downward along a path which is diverging with respect to the harvester centerline 22, i.e., the transverse spacing between the returning center chains of the two row harvester increases (or less desirably remains constant) but does not decrease. By arranging the returning center chains in a diverging manner, the likelihood of leaf material building up between the center chains and plugging the center chains is significantly reduced. Also, a guard covering 76 (see FIG. 4) is provided for covering each of the center chains 46 during return to the front of the harvester, and also thus prevents leafy material from building up on the front portion of the chains and jamming the chains. The guard 76 preferably extends at least substantially from the top chain sprocket 68 to the bottom chain sprocket 69 such that no significant portion of the returning center chain will become jammed with leaves.

With the conventional chopper harvester, the topper is positioned far out in front of the body of the harvester, and the operator can thus see the cane after it is topped but before it is knocked down. This also allows the topped cane to move a substantial distance in the direction of the harvester travel before the cane is knocked down and brought into the mouth of the harvester. The turnaround mechanisms 62 in the harvester of the present invention move the upper portion of the millable cane stalk from the two rows toward the center of the harvester and then forward of the harvester, thereby allowing the operator to view the freshly topped cane and judge if it is being topped too high or too low.

Referring again to FIG. 2, the transverse spacing between the gatherer chain centerlines 52 does not increase, as does the spacing between the right side gatherer chain centerline 52 and the cane to the right of the harvester due to the function of the crop divider scroll. Since the transverse spacing between the gatherer chain centerlines 52 may remain less than the length of an average cane leaf, the leaves in the two harvested rows may remain somewhat intertwined as the cane is uplifted and then topped. This is not necessarily undesirable, however, since these two rows of cane are brought toward the centerline 22 of the harvester, which is aligned with the furrow between the two harvested rows, after topping and base cutting.

Each of the base cutter blades 80 (see FIG. 1) base cuts a row of cane at substantially the same time or promptly after the cane is being topped. Each base cutter blade 80 may be provided with circumferentially spaced raised fins or flat bar kickers 82 for aggressively throwing the bottom cane stalks toward the center of the harvester. Each of the two rows of incoming cane are thus moved toward the center of the harvester before the cane is caught by the feed rollers 72, 74 which feed the cane into the body of the harvester. Each of the feed roller 72, 74 may be spring biased so that the pair of rollers exert a desired pulling force on the incoming cane without crushing the cane stalks. Additional feed rollers (shown in FIG. 5) may be used to feed the cane stalks into the body of the harvester. The cane is transversely thinned by the action of the base cutter blades prior to being fed into the mouth of the harvester for more efficient cleaning as it passes through the harvester. Accordingly, a substantially uniform quantity of cane is fed into the mouth of the harvester, which is defined as the transverse spacing between the base cutter blades 80 (but slightly less than the transverse spacing of blades 80 due to the turnaround devices) and the vertical spacing between the first pair of feed rollers.

A horizontal backfeed roller 70 is mounted just behind the center scroll 33 and the gather chain assemblies 46, 48. Backfeed roller 70 catches the upper portion of the base cut millable cane stalks as they are thrust forward by the turnaround device 62, and supports the upper ends of the cane stalks and prevents them from getting pinched between the components of the scroll support lifting mechanism 42 and the center gather chain supports. The center gatherer chains 46 return to the front of the harvester, moving in a direction to help bring the upper portions of the cane stalk forward while the base of the cut cane is moved transversely and thinned, and thus substantially evenly distributed between the gatherer chain centerlines 52 for entering the harvester between the front feed rollers 72 and 74 (see FIG. 2). If the millable cane stalk height is less than spacing between base cutter blade 80 and roller 70, the upper portion of the cane never reaches the backfeed roller 70. When harvesting taller cane, however, the roller 70 has the function of holding the cane off the ground during the periods while the base of the millable cane stalk moves transversely and is fed into the feed rollers 72 and 74. Since the upper part of the millable cane stalk is kept off the ground, the cane stalk top does not drop into the mud while it is being fed into the harvester.

A stalk knock down drum 88 as shown in FIGS. 1 and 2 is also provided. The drum 88 further ensures that the lower portion of the millable cane stalk is moved out of the way of the incoming cane. The transverse paddles 89 on the drum may be inclined in a slightly spiralling manner to further assist in thinning the can transversely between the two cut rows. Knock down drum 88 thus cooperates with the returning center chains 46 and the base cutters 80 to move the lower portion of the two rows of cane toward the center of the harvester while simultaneously positioning the cane for feeding bottom first into the mouth of the harvester.

Figure 5:
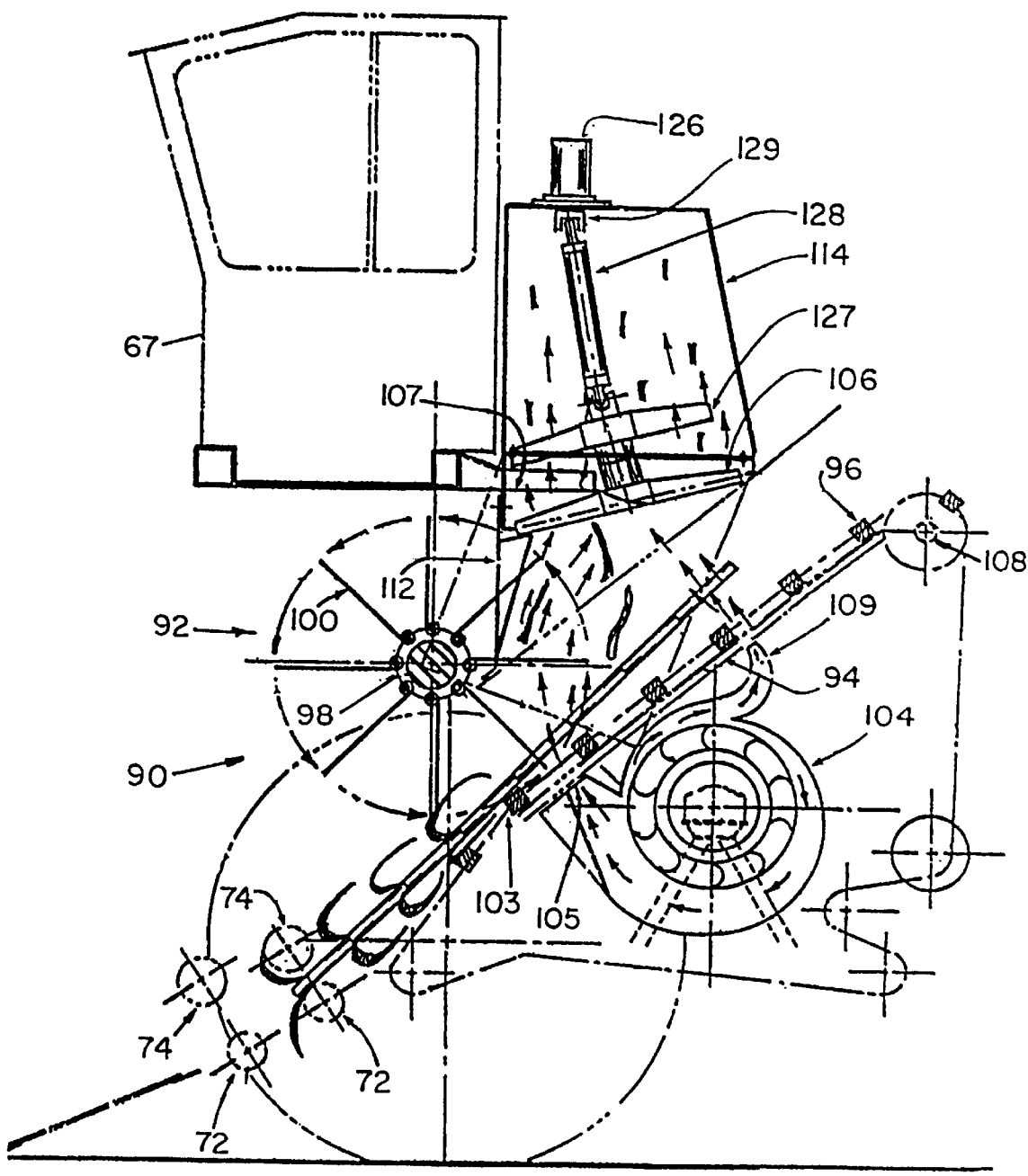
FIG. 5 is a side view of a portion of the harvester as shown in FIGS. 1 and 2, illustrating particularly the mechanism for cleaning the cane stalks.

As the cane moves through the body of the harvester, it is cleaned at station 90 (see FIGS. 1 and 5) in the whole stalk condition. Whole stalk cleaning is accomplished by mechanical stripping the leaves from the whole stalk cane prior to chopping or otherwise cutting the millable cane stalk. Leafy extraneous material is removed from the harvester and is deposited in the field in a manner which does not cover or otherwise smother the cane stubble which will regrow new rows of cane. The whole stalk cleaning mechanism 90 includes rotating horizontal stripping mechanism 92 which is positioned above a slat-type conveyor 94. The slat-type conveyor receives the incoming cane stalks from the feed rollers 72, 74. Stripping mechanism 92 removes the cane leaves from each stalk of cane as the cane is passed, preferably lengthwise and base first, between the slats 96 of the conveyor. The stripping mechanism 92 comprises a rotatable stripper shaft 98 and a plurality flexible spring tines or stripping springs 100 each extending radially from and distributed about the shaft. The shaft 98 rotates in a counter clockwise direction as shown in FIG. 5 so that the spring tines 100 remove the leaves from each cane stalk while pressing the leaves downward relative to the base of the cane stalk. This action ensures efficient removal of each leaf from the stalk without damaging the stalk.

Radial spring tines 100 are preferably distributed on the shaft 98 in an organized fashion. In the exemplary embodiment, each 45° rotation of the stripping shaft 98 has spring tines 100 extending therefrom. Air is pulled upward through the conveyor 94 by powered extractor fans 106. Air is also pushed upward through the conveyor 94 by lower blower fans 104. A forced air stream is thus created by the extractor fans 106 and the lower blower fans 104 to continuously remove any leafy material pulled off the cane stalks by the spring tines 100. Delivery of small quantities of leaf material into the air stream at frequent intervals per revolution of the stripper shaft 98 assists in efficient removal of the leafy material. As the spring tines 100 engage the cane stalks, leaves on the cane stalks protect the cane stalks from the mechanical action of the tines while the leafy material is removed, thereby minimizing damage to the cane stalks. The wax coating on the cane stalk also protects against damage to the cane during subsequent movement of the cane stalks along the slats 96.

The leafy material is removed from the spring tines 100 as a result of both mechanical forces and air flow forces. Mechanical forces caused by the rotating action of the shaft 98 thus create a centripetal force tending to pull the leaves off the individual tines 100 as they return to their radially free position after passing through and being bent slightly backward by the cane. This centripetal force combines with the force of the air flow stream created by the discharge from the blower fans 104 and the pulling action of the extractor fans 106 to remove leaves from the stripper tines.

Slat conveyor 94 passes the cane preferably lengthwise through the cleaning system. If desired, the slat conveyor may include a slight bend 103 (see FIG. 5) below the stripping mechanism 92 to cooperate with rotating tines 100. The bend 103 allows the rigid stalks of cane to be engaged by the stripping tines at a steeper angle than when the cane rests on the slats 96. Accordingly, the cane is raised from the slats when the stripper tines 100 engage the cane. Also, the cane is at least partially lifted off the slats 96 by the rotating tines 100. This allows the tines 100 to mechanically work all the way through the passing cane without interfering with the slats 96. The blower fans 104 and the extractor fans 106 also raise the leafy material and float the whole stalk cane into the stripping tines 100 to ensure that the tines 100 work all the way through the passing cane. In a conventional chopper harvester, the volume of air passing by the cane for this stage of cleaning is significantly restricted so that short pieces of chopped cane do not get removed with the trash. The cane harvester of the present invention cleans the cane in the whole stalk condition and accordingly large quantity of cleaning air may be used to remove the leafy material without unintentionally removing millable pieces of cane.

The travel path 95 of the slat conveyor 94 allows for the use of large blower fans 104 for discharging air upward to impinge the slats 96. The discharge from the lower blower fans 104 may be very close to the floor of the conveyor 94 for more efficient cleaning. The slats 96 of the conveyor 94 are constructed to minimize the blockage of air flow from the lower blower fans 104 while still supporting the cane as it is impinged by the rotating tines 100. Once passing by the discharge from the lower blower fans, the spacing between the slots 96 allows leaves and trash to fall to a lower conveyor (not shown) while the cleaned cane stacks supported on the slots 96 pass over the drum 108. Some leafy material removed from the cane stalks may be trapped between the conveyor floor and the cane stalks, and is passed around conveyor drum 108. This leafy material is allowed to drop into another conveyor (not shown) and be discharged from the harvester for deposit in the furrow so that it is run over by the rear tire 15. Lower blower fans 104 and the extractor fans 106 cooperate to ensure that most of the leafy material removed from the cane stalks is pulled upward out from the cleaned cane.

Spring tines 100 pass through a fixed baffle plate 112 to further assist in removing any leaves otherwise remaining on the spring tines. The tines 100 thus pass through respective slots in the baffle plate 112. The leafy material removed by the plate 112 is then pulled away by the extractor fans 106. The baffle plate 112 ensures that any leafy material remaining on the spring tines is pulled off the tines directly in front of the extractor fans for separation from the stripping mechanism 92, thereby alleviating buildup of leafy material and restriction of movement of the spring tines through the baffle plates. In alternate embodiments, the baffle plate 112 may be eliminated.

Most of the air discharged by the blower fans 104 exits large nozzles 105 for blowing leaves from the rotating tines 100 upward toward extractor fans 106. Each extractor fan 106 may be powered by a motor 126 exterior at the air duct 114. The motor 126 rotates a drive shaft 128 within the air duct which extends to the fan 106. U-joints 129 at the ends of the shaft 128 interconnect with the motor drive shaft and the fan shaft. The blade of the fan 106 is rotatable mounted on an arm 107 which extends inwardly to the center of the duct 114. A sweeper blade 127 sweeps leaves off the arm 107 to prevent leaf buildup, and assists in the continuous discharge of leaves through the ducts 114 of the harvester.

A second smaller but high speed discharge nozzle 109 from the lower blower fans 104 may be provided for discharging air directly toward the center of the extractor fans 106 to help push the free floating leafy material into the suction of the extractor fans. In another embodiment, the lower blower fans may be eliminated and air may be pulled upward through the slat-type conveyor 94 only by extractor fans 106. This embodiment substantially simplifies the flow path 95 of the slat-type conveyor 94, since in the embodiment shown in the drawings the conveyor travel path 95 must be diverted around the lower blower fans.

Figure 6:
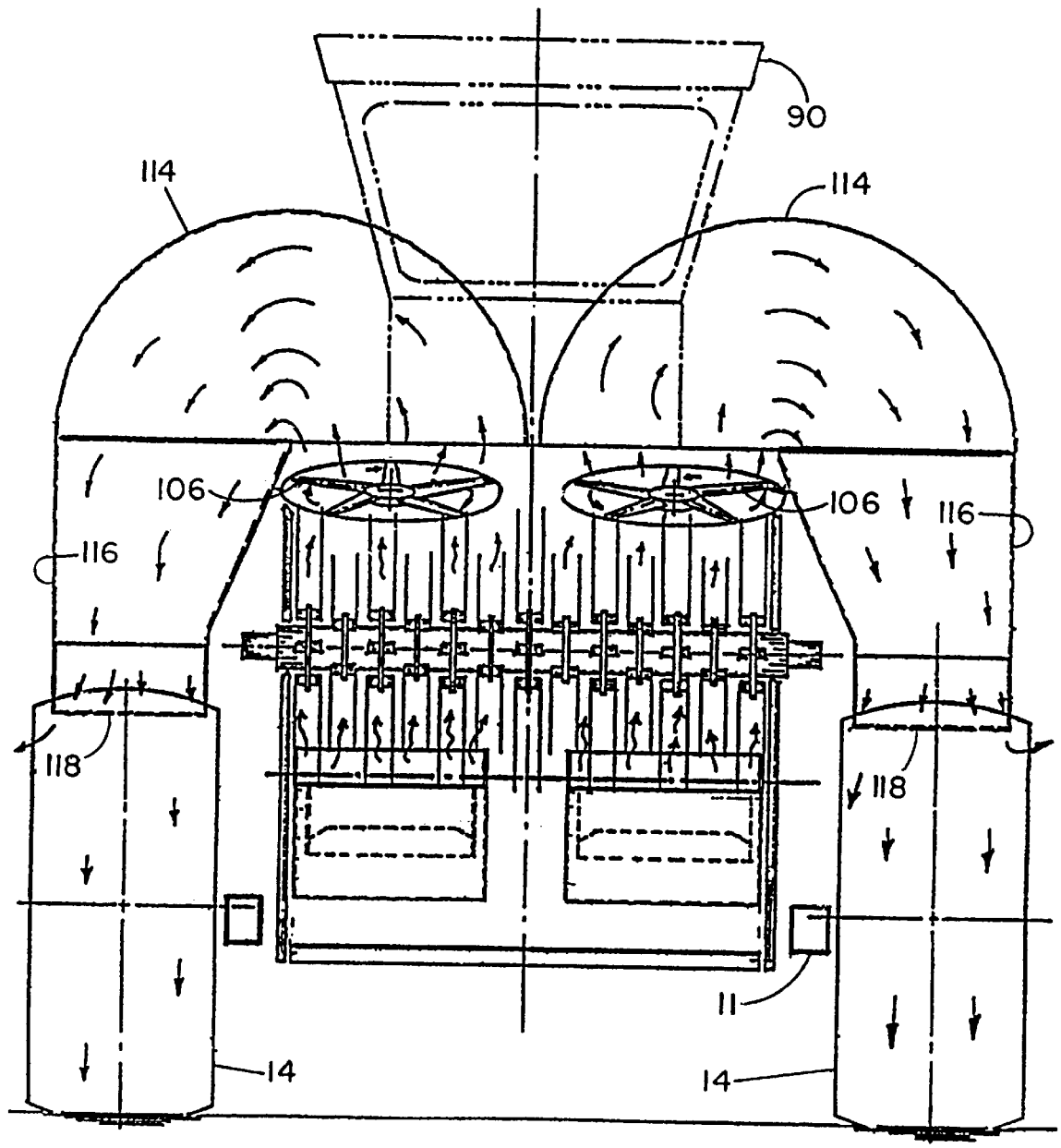
FIG. 6 is a rear sectional view illustrating the cleaning portion of the harvester shown in FIG. 5.
Figure 7:
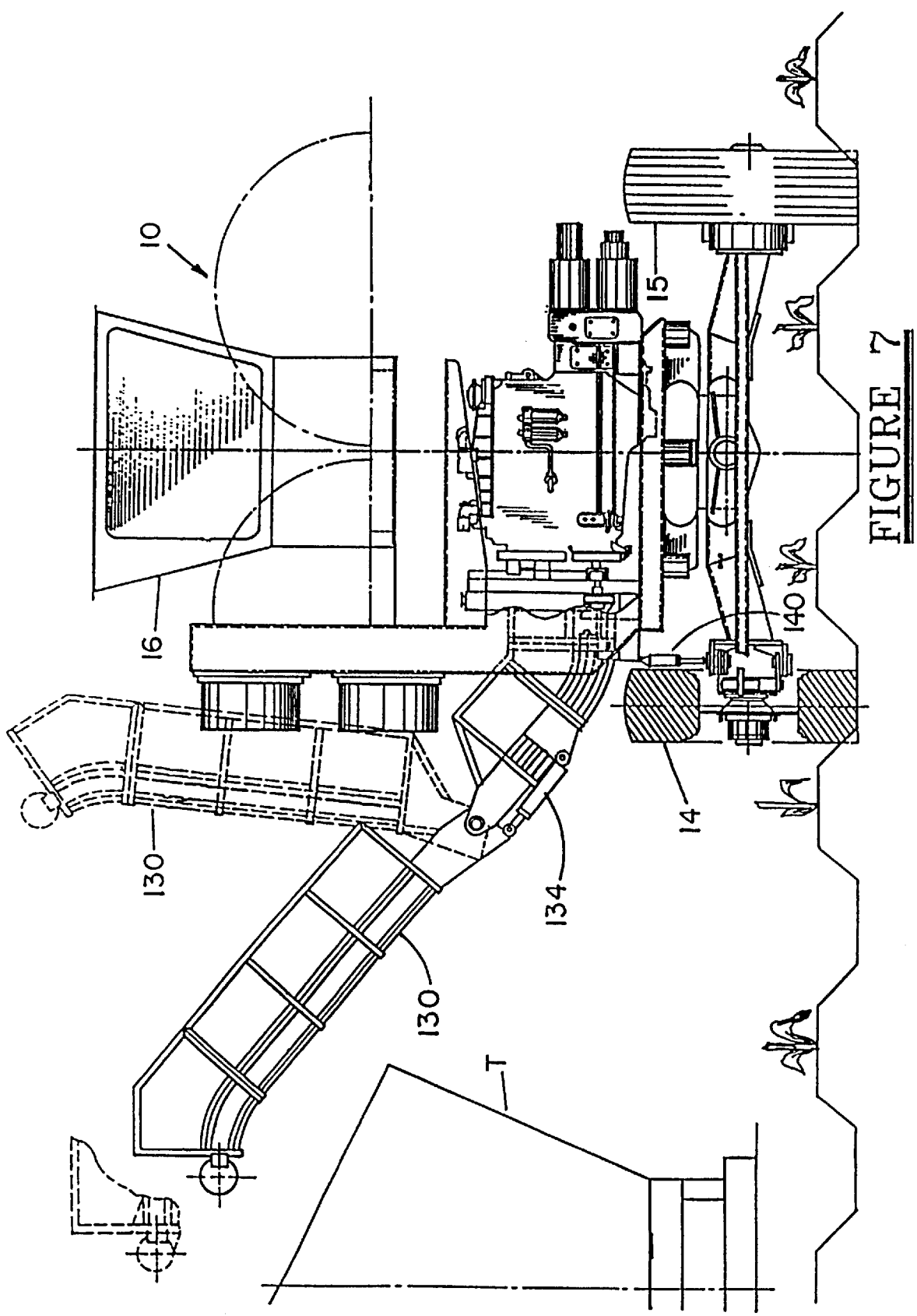
FIG. 7 is a rear view of a portion of the harvester as shown in FIGS. 1 and 2, illustrating particularly the conveyor mechanism for discharging the billets into the transport and the hydraulic jack for leveling the harvester in the field.

Each of the two axial-type extractor fans 106 are positioned over the passing cane to suck the leaves which have been stripped from the cane stalks out of the area of the conveyor 94 and into one of the two air ducts 114 for being discharged subsequently into the field. Air ducts 114 thus pass the leafy material from the extractor fans 106 out of the harvester. The air ducts 114 are located on each side of the harvester and direct the leafy material in front of the large front tires 14 of harvester, allowing the tires 14 and 15 to compact the extraneous leafy material as the tires press the deposited material into the ground. Each air duct 114 may have perforations 116 as shown in FIG. 6 to allow some of the air from the extractor fans to escape before the leaf discharge 118 from the ducts 114, so that the velocity of the leafy material slows down before it is blown onto the ground. Interior surfaces of the air ducts 114 and components within the air duct downstream from the extractor fans 106 may be coated with a low friction coating, such as Teflon, to reduce leaf buildup within the ducts. The extraneous leafy material from the air ducts 114 is combined with the leafy material removed by the topper, so that all leafy material is shredded to make a compact mixture which is then rolled on by the tires of the harvester. The leafy material is thus incorporated into the soil where it will serve as an organic material for the next crop, and also assists in propelling the harvester through the field in wet conditions. Because the harvester tires straddle two rows, the extraneous leafy material is deposited in alternate furrows between the rows which allows more efficient alternate row irrigation techniques to be used.

The clean stalk of cane may be delivered from the harvester in three forms: (1) whole stalk, (2) semi-whole stalk and (3) extended billets. As previously noted, by cleaning cane whole stalk, valuable juice within the stalk is protected. In a preferred embodiment, the green whole stalk is cleaned, then the cane stalk is cut into extended billets typically having a length of about sixteen to twenty inches, although the length of the billets may be adjusted as desired. Most importantly, the length of the billets need not be shortened in order to obtain reasonably efficient cleaning in the manner of a conventional chopper harvester. The cane is cut into selected length billets by passing between the oppositely rotating cutter wheels 120 and 122, as shown in FIG. 1. The length of the billets may be controlled by adjusting the speed of the cutter wheels 120, 122 relative to the speed of the conveyor 94. Longer billet lengths will help to reduce the amount of cane juice lost from cut ends and will also reduce cane deterioration. Extended billets may be dumped from conveyor 94 onto conveyor 130, which carries the billets to a conventional transport T for delivery to the mill. If desired, a second stage extractor fan 132 may be installed on the harvester behind the cutter wheels 120, 122 for removing any remaining leafy material in the billets on the conveyor 130. The conveyor 130 includes hydraulically powered cylinders 134 for desirably positioning the discharge from the conveyor to the transport T, or for positioning the conveyor 130 vertically for storage.

As an alternative to the extended billet cutting of the cane, the cutters 120 and 122 may be eliminated or deactivated, and the harvester may deliver whole stalks of cane directly into a two bin trailer (not shown) pulled behind the harvester. At the end of every cane row, the full trailer may be released by the harvester and an empty trailer may then be hitched to the harvester. A two bin trailer may be designed with separate forward and rear compartments for each bin to ensure enough capacity for harvesting two rows of cane in a complete pass through the field. Accordingly, the front and rear ends of the trailer may be alternately connected to the harvester so that two rows of cane are harvested, the trailer is turned around, two more rows are harvested, then the trailer is disconnected from the harvester. Trailers with whole stalk cane may then be brought to a conventional dumping station where the cane is removed from the trailers and either stored on the ground in piles or loaded directly into a road transport to the mill. Several large capacity, two row wide, forward and rear compartment trailers used with a harvester solves many of the problems encountered by other harvesting operations.

In still another alternative, the harvester may deliver the clean cane in semi-whole stalk lengths if from 3 ft. to 6 ft. The cutters 120 and 122 are thus activated to rotate slowly to output semi-whole stalk cane. The harvester may discharge two rows of semi-whole stalk cane out the rear of the harvester for being deposited transversely across the cut cane rows. The harvester delivery system may also be provided with a discharge mechanism which allows the next two adjacent rows of semi-whole stalk cane to be delivered out the side of the harvester and onto the previously cut and piled semi-whole stalk cane, so that a four row heap of semi-whole stalk cane is provided for more efficient loading. A conventional two-row loader with modified pick up forks to accommodate the shorter pieces of cane may then be used to load the transversely piled cane into a conventional transport. Because most tropical cane is planted in a five foot row spacing, cutting the cane in a semi-whole stalk condition is a practical way to stack the cane between the narrow row width and still be able to pass the harvester over the next two rows without the harvester running over the cane which has been cut and piled on the previous pass.

The above options make conversion from hand-cutting and piling to mechanical harvesting quite easy. Growers are provided with a flexible harvesting system since the cane may be accumulated in the field or at the mill yard for storage before processing.

In a conventional harvesting operation as described herein, it should be understood that the right side tires are conventionally moving in a fresh furrow as the right side scroll assembly separates the right side harvested row from the adjacent cane row to the right of the harvester, while the left side front and rear tires travel in a furrow which has been previously tracked over by the right side tires. Accordingly, the left side of the harvester may tend to tilt below the right side of the harvester. In order that the harvester be level when operating, one or more hydraulic jacks 140 may be provided for selectively raising or lowering the left side of the harvester frame relative to the right side of the harvester frame. By adjusting the flow of fluid to the hydraulic jacks 140, the operator incapable may maintain the harvester in a level position while passing through cane field.

Various modification to the components of the harvester may be made and will be suggested by the above disclosure. For example, the harvester has conventional front and rear tires as shown in the figures to move the harvester through the field. Other rotatable drivers may be used for this purpose. In wet conditions, for example, rotatable tracks similar to tracks commonly employed on other heavy industrial and military equipment may be used to move the harvester through the field.

A pair of oppositely rotating gatherer chains as disclosed herein are preferred to bring each row of cane into the respective topper mechanism. Other gatherer mechanisms may be used, however, to both lift the fallen cane stalks upwardly and to support the fallen cane stalks along substantially a gatherer centerline as the harvester moves toward the supported cane stalks. Also, a preferred embodiment of a turnaround device is disclosed for transversely moving the cane stalks from the gatherer centerline and thrusting the cane stalks in an opposite direction away from the harvester movement. Other configurations of turnaround devices may be employed to accomplish this objective. Other configurations of topper mechanisms and base cutters may also be used to top and base cut the cane stalks, respectively. The harvester may use a rotating cross-flow cutter instead of the cutter wheels 120, 122 shown in the drawings. Rotating tines and a slat-type conveyor are used in a preferred cleaning mechanism within the harvester, although again other mechanisms may be used for pulling the leaves off the cane stalks in a direction toward the base of the cane stalk. Various types of fans or blowers may be used for removing cane leaves from the conveyor, and preferably for depositing the cane leaves for being run over by the rotating drivers of the harvester.

Each of the powered components of the harvester, including the gatherer chains, the topper mechanism, the base cutters, the knock down drum, the slat conveyor, the air blowers, the extractor fans, the cutter wheels, and the discharge conveyor, may be conventionally powered by a suitable drive motor, such as a hydraulically powered motor supplied with pressurized hydraulic fluid from a source carried by the harvester frame. The source of hydraulic fluid in turn may be powered by the engine 12 or by another power unit. In other applications, some of these motors may be electrically or pneumatically powered. Various controls may be provided in the cab 16 for controlling the speed of each of these motors. Other components in the harvester, including the scrolls, the base cutters, the topper mechanisms, and the discharge conveyor, may be raised or lowered by separate controls in the cap 16 which regulate fluid to suitable hydraulic or pneumatic cylinders.

The chopper harvester of the present invention is a two-row harvester, which has significant advantages over a single-row harvester. The concepts of the present invention may, however, be applied to a single-row harvester. A turnaround device would still be employed for moving the supported cane stalks transversely with respect to the gatherer centerline and for thrusting the topped cane stalks in a direction away from the harvester movement. In most applications, the turnaround device of a single-row harvester desirably would move the cane stalks transversely away from the activated scroll assembly so that the topped cane would be adjacent to the side of the harvester nearer the cane row previously harvested. Other types of knock down drums may be used for assisting in knocking down the base cut cane for base entry into the harvester. The horizontal back-feed roller near the front end of the harvester serves to support the top of the long cane stalks and prevent these tops from engaging the ground. Other types of horizontal support members may be used to accomplish this objective.

The embodiments of the invention as described above and the methods disclosed herein will suggest further modifications and alterations to those skilled in the art. Such further modifications and alterations may be made without departing from the spirit and scope of the invention, which is defined by the scope of the following claims.

What is claimed:

1. A cane harvester for harvesting cane from a cane field, the harvester including a harvester frame, a plurality of rotating drivers for supporting the harvester frame while moving the harvester through the cane field, and drive engine for powering the rotating drivers, the cane harvester further comprising:
   a topper mechanism for topping the cane stalks;
   a base cutter for cutting a base of the cane stalks;
   a harvester intake for receiving the base cut cane base first into the harvester;
   a rotatable cleaning shaft supporting a plurality of elongate flexible members extending radially therefrom;
   a drive member for powering the cleaning shaft in a direction such that the plurality of flexible members force leaves on a cane stalk in a direction toward a base of a cane stalk to remove the leaves from the cane stalk;
   an extractor fan for removing the leaves from the plurality of flexible members and the cleaned cane; and
   a discharge conveyor for discharging cleaned cane from the harvester.

2. A cane harvester as defined in claim 1, further comprising:
   a slat-type conveyor for transporting the cane between the harvester intake and the discharge conveyor, the slat-type conveyor including a plurality of elongate slats each separated by a substantial spacing such that cane stalks are supported on the slats and air moves between the slats toward the extractor fan to move leaves toward the extractor fan.

3. The cane harvester as defined in claim 2, further comprising:
   a blower fan positioned opposite the cane stalks relative to the extractor fan for blowing air between the plurality of slats and toward the extractor fan.

4. The cane harvester as defined in claim 1, further comprising:
   a cane leaf duct for transporting cane leaves between the extractor fan and a location exterior of the harvester and depositing cane leaves in front of at least one of the plurality of rotating drivers.

5. The cane harvester as defined in claim 4, wherein the cane leaf duct comprises:
   a left side duct on the left side of the harvester frame for depositing cane leaves in front of a left side rotating driver; and
   a right side duct on the right side of the harvester frame for depositing cane leaves in front of a right side rotating driver.

6. The cane harvester as defined in claim 1, further comprising:
   a cane stalk cutter mechanism positioned between the rotatable cleaning shaft and the discharge conveyor for cutting cleaned cane stalks into selected billets.

7. The cane harvester as defined in claim 1, further comprising:
   at least one powered scroll for separating a cane row to be harvested from an adjacent cane row passed by the harvester.

8. The cane harvester defined in claim 1, further comprising:
   a turnaround device for moving the cane stalks transversely from a gatherer centerline and for thrusting the cane stalks in the direction away from forward movement of the harvester after topping the cane stalks and prior to receiving the cane stalks into the harvester.

9. The cane harvester as defined in claim 1, further comprising:
   first and second powered rotatable gatherer chains each extending in a loop between a respective lower chain sprocket and a respective upper chain sprocket, the transverse spacing between the first and second gatherer chains being restricted to support the cane stalks therebetween.

10. The cane harvester as defined in claim 1, wherein the plurality of flexible members create a centripetal force which pulls the leaves off the flexible members and away from the cane stalks.

11. A method of harvesting sugar cane from a cane field including, the harvester including a harvester frame, a plurality of rotating drivers for supporting the harvester frame while moving the harvester through the cane field, and drive engine for powering the rotating drivers, the method comprising:
   topping the cane stalks;
   cutting a base of the cane stalks;
   receiving the cut cane base first into the harvester;
   powering a rotatable cleaning shaft supporting a plurality of elongate flexible members extending radially therefrom;
   rotating the cleaning shaft in a direction such that the plurality of flexible members contact an engaging portion of cane stalks and force leaves on a cane stalk in a direction toward a base of a cane stalk to remove the leaves from the cane stalk, each of the plurality of flexible members having a length extending radially from the rotatable cleaning shaft such that an end of the flexible member passes between the cane stalks and to at least a distal portion of cane stalks opposite the rotatable cleaning shaft with respect to the engaging portion of the cane stalks;
   removing the leaves from the plurality of flexible members and the cleaned cane; and
   discharging cleaned cane from the harvester.

12. The method as defined in claim 11, further comprising:
   the plurality of flexible members clean leaves off whole stalk cane; and
   cutting the cleaned whole stalk cane into selected billets.

13. The method as defined in claim 11, further comprising:
   powering a slat-type conveyor for transporting the cane past the rotating cleaning shaft, the slat-type conveyor including a plurality of elongate slats each separated by a substantial spacing such that cane stalks are supported on the slats and air moves between the slats to remove the leaves.

14. The method as defined in claim 13, further comprising:
   powering a blower fan for pulling air through the plurality of elongate slats and discharging removed leaves via a discharge duct.

15. A method of harvesting sugar cane from a cane field, the harvester including a harvester frame, a plurality of rotating drives for supporting the harvester frame while moving the harvester through the cane field, and drive engine for powering the rotating drivers, the method comprising:

topping the cane stalks;

cutting a base of the cane stalks;

receiving the cut cane base first into the harvester and passing the cut cane along a substantially single planar path toward a discharge of the harvester;

powering a rotatable cleaning shaft supporting a plurality of flexible members extending radially therefrom;

rotating the cleaning shaft in a direction such that the plurality of flexible members engage the cane stalks while positioned along the substantially single planar path and force leaves on a cane stalk in a direction toward a base of a cane stalk to remove the leaves from the cane stalk;

powering a slat-type conveyor for transporting the cane past the rotating cleaning shaft, the slat-type conveyor including a plurality of elongate slats each separated by a substantial spacing along the substantially single planar path;

removing the leaves from the cleaned cane; and discharging cleaned cane from the harvester.

16. The method as defined in claim 15, wherein removing the leaves further comprises:

pulling air from between the slats to remove the leaves from the cane stalks.

17. The method as defined in claim 15, further comprising:

the plurality of flexible members clean leaves off whole stalk cane; and cutting the cleaned whole stalk cane into selected billets.

18. The method as defined in claim 15, further comprising:

powering a blower fan for pulling air past the plurality of flexible members and discharging removed leaves via a discharge duct.

19. The method as defined in claim 15, further comprising:

lifting fallen cane stalks upwardly and supporting the fallen cane stalks along substantially a gatherer centerline as the harvester moves toward the supported cane stalks.

20. The method as defined in claim 19, further comprising:

moving the supported cane stalks transversely from the gatherer centerline and thrusting upper portions of the cane stalks in the direction away from the harvester after topping the cane.

21. The method as defined in claim 20, wherein two rows of cane are simultaneously harvested, and wherein moving the supported cane stalks transversely comprises moving each row of cane stalks transversely inward toward a centerline of the harvester for transversely thinning the cane stalks before receiving the cut cane into the harvester.

22. A cane harvester for harvesting cane from a cane field, the harvester including a harvester frame, a plurality of rotating drivers for supporting the harvester frame while moving the harvester through the cane field, and drive engine for powering the rotating drivers, the cane harvester further comprising:

a topper mechanism for topping the cane stalks;

a base cutter for cutting a base of the cane stalks;

a harvester intake for receiving the base cut cane base first into the harvester;

a rotatable cleaning shaft supporting a plurality of elongate flexible members extending radially therefrom;

a drive member for powering the cleaning shaft in a direction such that the plurality of flexible members force leaves on a cane stalk in a direction toward a base of a cane stalk to remove the leaves from the cane stalk;

a cane leaf duct for transporting cane leaves between an extractor fan and a location exterior of the harvester;

a discharge conveyor for discharging cleaned cane from the harvester; and a cane stalk cutter mechanism positioned between the rotating cleaning shaft and the discharge conveyor for cutting cleaned cane stalks into selected billets.

23. The cane harvester as defined in claim 22, wherein each of the plurality of flexible members have a length extending from the rotating cleaning shaft such that an end of flexible member passes between the cane stalks and from a flexible member contact engaging portion of the cane stalks to at least a distal portion of the cane stalks opposite the rotating cleaning shaft with respect to the engaging portion of the cane stalks.

24. The cane harvester as defined in claim 22, further comprising:

a slat-type conveyor for transporting the cane stalks past the rotating cleaning shaft, the slat-type conveyor including a plurality of elongate slats.

25. The cane harvester as defined in claim 22, wherein the plurality of flexible members create a centripetal force which pulls the leaves off the flexible members and away from the cane stalks.

* * * * *